U. D. Mihill,

Wire Fence.

No. 109,036. Patented Nov. 8, 1870.

Witnesses:

Inventor:
U. D. Mihills
PER
Attorneys.

UNITED STATES PATENT OFFICE.

URIAH D. MIHILLS, OF FOND DU LAC, WISCONSIN.

IMPROVEMENT IN FENCES.

Specification forming part of Letters Patent No. 109,036, dated November 8, 1870.

*To all whom it may concern:*

Be it known that I, URIAH D. MIHILLS, of Fond du Lac, in the county of Fond du Lac and State of Wisconsin, have invented a new and useful Improvement in Fence; and I do hereby declare that the following is a full, clear, and exact description thereof, which will enable others skilled in the art to make and use the same, reference being had to the accompanying drawing, forming part of this specification.

Figure 1:
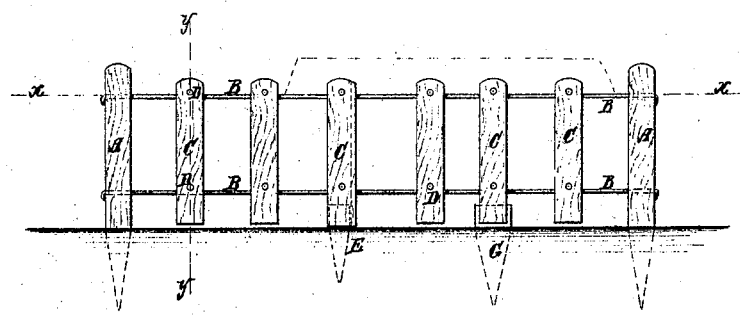
Figure 2:
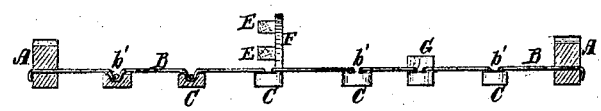
Figure 3:

Figure 1 is a side view of my improved fence. Fig. 2 is a top view of the same, partly in section, through the line $x\,x$, Fig. 1. Fig. 3 is a vertical longitudinal section of the same, taken through the line $y\,y$, Fig. 1.

Similar letters of reference indicate corresponding parts.

My invention relates to improvement in fences of that class in which the pickets are attached to wires running horizontally from one post to another.

The invention consists in the employment of short posts in connection with the other parts of the fence, all constructed and arranged substantially as shown and described.

A are the posts, to which the ends of the wires B are secured.

The posts A may be thirty-two feet (more or less distance) apart, and should be firmly set in the ground.

The wires B have small loops, $b'$, formed upon them at a distance apart equal to the required distance apart of the pickets C, which distance may vary with the character of the fence. Upon the inner sides of the pickets C are formed recesses to receive the loops $b'$ of the wires B, which thus keep the pickets from moving laterally upon the wire. The pickets C are secured to the wires B by the nails D, which are driven through the pickets from their forward sides, in such positions as to be clinched in the loops $b'$ of the wires B, as shown in Fig. 3. The loops $b$, by their spring, will allow the wires B to contract and expand with the variations of temperature without disturbing the firmness or stability of the fence. E are one or two short posts, driven into the ground about midway between the posts A, to the upper end or ends of which is nailed the lower end of the triangular or tapering board F, the straight edge of which is nailed to the picket C. At suitable distances apart are driven into the ground short posts G, to which are nailed the lower ends of the pickets C.

The short posts E and G, any desired number of which may be used, are designed to support the fence against downward or lateral sagging, or against lateral pressure.

Having thus described my invention, I claim as new and desire to secure by Letters Patent—

The short posts E and G, in combination with the pickets C, provided with grooves to receive the loops of the wires B, and braced by the bar F and posts E, all as and for the purpose set forth.

URIAH D. MIHILLS.

Witnesses:
DANL. LAMB,
G. N. MIHILLS.